United States Patent [19]

Yoshida

[11] 4,205,376
[45] May 27, 1980

[54] METHOD AND APPARATUS FOR INITIALIZING VEHICLE-MOUNTED COMPUTERS

[75] Inventor: Matuju Yoshida, Bisai, Japan

[73] Assignee: Nippondenso Co., Ltd., Kariya, Japan

[21] Appl. No.: 882,923

[22] Filed: Mar. 2, 1978

[30] Foreign Application Priority Data

Apr. 15, 1977 [JP] Japan .................. 52-43956

[51] Int. Cl.² .................. H03K 5/13; G06F 15/20
[52] U.S. Cl. .................. 364/424; 307/268; 364/120
[58] Field of Search .................. 364/424, 707, 120; 307/260, 268

[56] References Cited

U.S. PATENT DOCUMENTS

| | | | |
|---|---|---|---|
| 3,835,819 | 9/1974 | Anderson, Jr. | 364/431 |
| 3,942,042 | 3/1976 | Nikami | 307/268 |
| 3,955,185 | 5/1976 | Nishimura | 364/707 |
| 3,961,207 | 6/1976 | Minakuchi | 307/268 |
| 3,969,614 | 7/1976 | Moyer et al. | 364/431 |

Primary Examiner—Felix D. Gruber
Attorney, Agent, or Firm—Cushman, Darby & Cushman

[57] ABSTRACT

A method and apparatus for initializing the operating condition of a computer mounted on a vehicle. The computer is programed to perform calculating operations required to control the operation of the vehicle in accordance with a preestablished operating sequence. An initializing pulse is produced in response to the start of supplying the electric power of a battery and applied to the computer so that the computer is initialized to perform the required operations. Another initializing pulse is produced in response to the end of cranking the engine mounted on the vehicle and applied to the computer to initialize again. Initializing the computer after cranking the engine prevents the computer from stopping the operation, the stoppage of which is likely to be caused by an electric noise signal produced at the end of cranking the engine.

4 Claims, 3 Drawing Figures

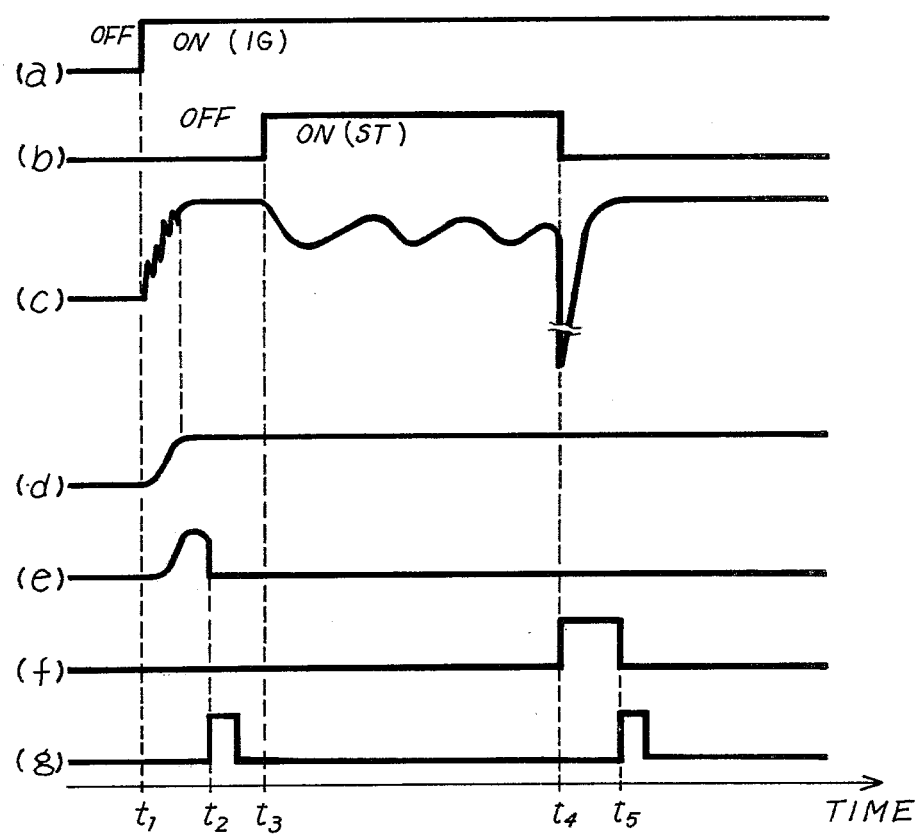

METHOD AND APPARATUS FOR INITIALIZING VEHICLE-MOUNTED COMPUTERS

BACKGROUND OF THE INVENTION

The present invention relates to a method and apparatus for initializing vehicle-mounted computers, and particularly to the method and apparatus for initializing the vehicle-mounted computers each time when supplying the electric power of a battery is started and when cranking an engine is terminated.

It has been known in the field of controls for an automotive vehicle that operations of the vehicle are controlled electronically by a digital computer programmed to perform various calculating operations in accordance with a preestablished operating sequence. Some of these controls are disclosed in U.S. Pat. No. 3,835,819 of Anderson and 3,969,614 of Moyer et al in which controls for the vehicle are directed to the controls for the fuel supply, ignition and so forth of internal combustion engines mounted on the vehicle. In these patents, the digital computer is programmed to perform various calculating operations on a time-sharing and software basis in accordance with the operating sequence preestablished therein.

It has been also known that the digital computer must be initialized prior to starting the required calculating operations. With regard to initializing the computer, no suggestion has been made in the above-identified patents.

From the standpoint that the computer is generally intialized at the start of operating the computer, a first attempt was made in which the computer mounted on the vehicle for controlling the fuel supply and ignition of the engine was intialized at the start of connecting the storage battery of the vehicle to the computer through a constant voltage circuit. It was observed very often in many experiments conducted on this arrangement that the computer stopped the calculating operations at the end of cranking the engine and the engine was caused to stall thereafter. This drawback was analysed to result from a negative electric noise signal which appeared on a power supply bus at the end of cranking the engine. Since the electric power from the battery is supplied to the computer through the power supply bus and the constant voltage circuit, the constant voltage produced by the constant voltage circuit to maintain the operative condition of the computer is not produced while the negative noise signal appears. This results in the stoppage of the calculating operations of the computer.

SUMMARY OF THE INVENTION

It is therefore a primary object of this invention to provide an improved method and apparatus for initializing vehicle-mounted computers.

It is a further object of this invention to initialize vehicle-mounted computers each time when supplying the electric power of the battery of a vehicle is started and when cranking the engine of a vehicle is completed.

BRIEF DESCRIPTION OF THE DRAWINGS

In the accompanying drawings:

FIG. 3 is a waveform chart illustrating signal waveforms (a) through (g) with respect to the time.

DETAIL DESCRIPTION OF THE PREFERRED EMBODIMENT

Figure 1:
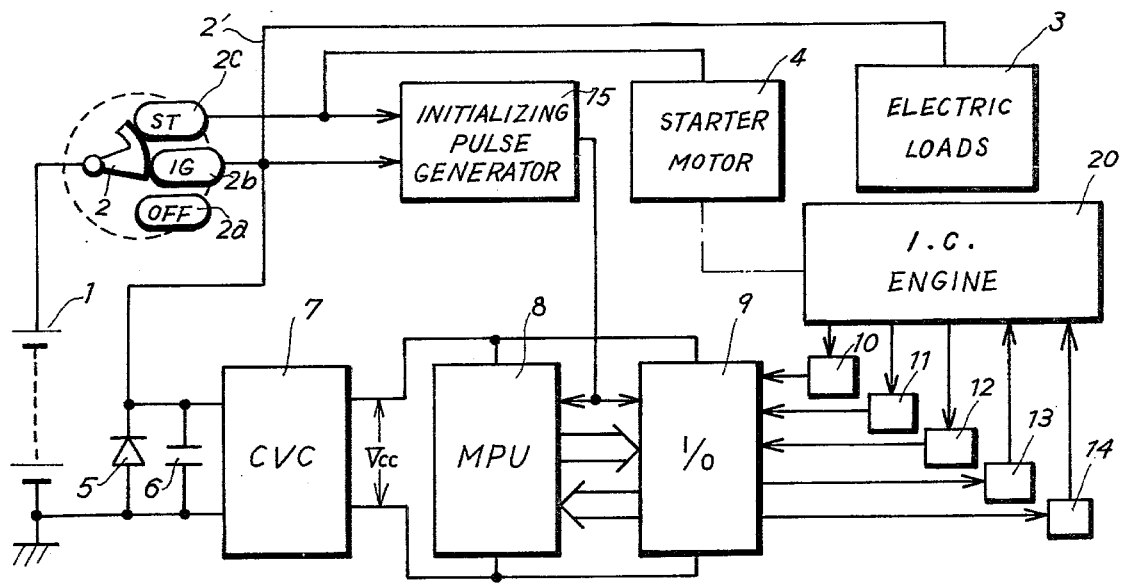
FIG. 1 is a schematic diagram illustrating the embodiment according to the present invention.
Figure 2:
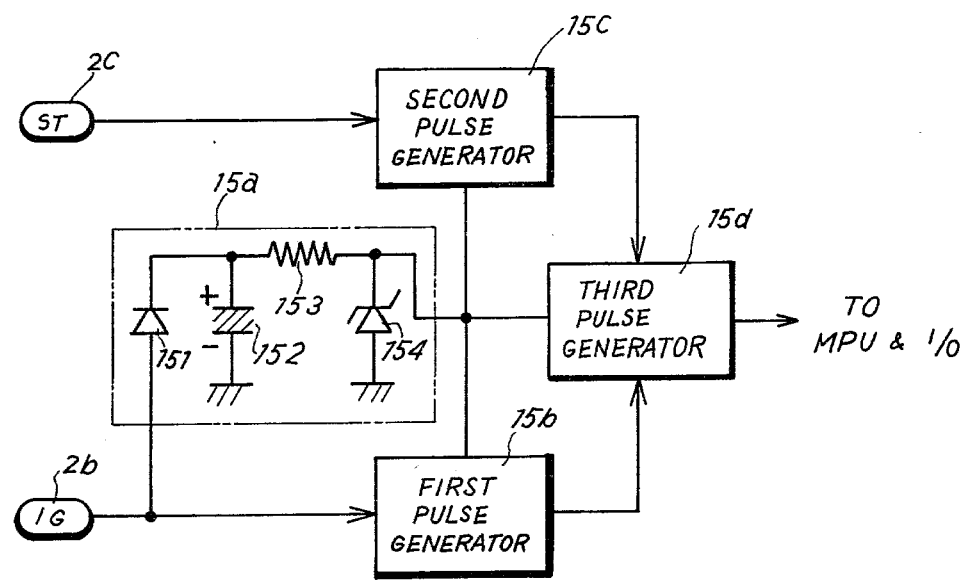
FIG. 2 is a block diagram illustrating circuit construction of an initializing pulse generator of FIG. 1.

The present invention is described hereinunder with referencre to FIGS. 1 through 3.

In FIG. 1, a storage battery 1 and a key switch 2 including an OFF terminal 2a, an ignition (IG terminal) 2g and a starter (ST) terminal 2c are connected in a conventional manner. The key switch 2 operated by a vehicle operator has such a configuration that only the IG terminal 2b is connected to the positive terminal of the battery 1 when the key switch 2 is moved toward the IG terminal 2b and that both the IG and ST terminals 2b and 2c are connected to the positive terminal of the battery 1 when the key switch 2 is moved toward the ST terminal 2c. Electric loads 3 such as lamps are connected to the IG terminal 2b, and a starter motor 4 is connected to the ST terminal 2c. As is known well, the starter motor 4 is engaged with the output shaft of an internal combustion engine 20 for engine cranking purpose during the connection between the key switch 2 and the ST terminal 2c, and the starter motor 4 is disengaged from the engine 20 during the disconnection between the key switch 2 and the ST terminal 2c.

Connected to the engine 20 are sensors 10, 11 and 12 which produce respective electric signal indicative of operating conditions of the engine 20 and controllers 13 and 14 which control operations of the engine 20. Provided that the fuel supply and ignition are desired to be controlled, the sensors 10, 11 and 12 are adapted to respectively sense the throttle position, rotational speed and temperature of the engine 20, and the controllers 13 and 14 are adapted to respectively control the fuel supply and ignition of the engine 20, for example. Other operating conditions such as the amount of air sucked into the engine 20 may be sensed to control the fuel supply and ignition. Although not shown in FIG. 1, the sensors and controllers are connected to the IG terminal 2b through a power supply bus 2' to be operated electrically.

The sensors 10 through 12 and the controllers 13 and 14 are connected to a digital computer which receives the output signals of the sensors 10 through 12, performs calculating operations in response to received signals and produces the electric signals indicative of the result of calculations. The computer mounted on the vehicle in this embodiment is shown simply by a microprocessing unit (MPU) 8 and an input/output circuit (I/O)9. The input/output circuit 9, including counters and registers, functions to convert the output signals of the sensors 10 through 12 into respective binary code signals and convert the binary code output signals of the processing unit 8 into respective output signals suitable for the controllers 13 and 14. The microprocessing unit 8 functions to perform various calculations on the binary code signals applied from the input/output circuit 9 in a time-sharing and software manner. The calculating sequence in the processing unit 8 is preestablished in a memory (not shown) which is operatively coupled with the processing unit 8. The sequence is so determined, for example, that calculations required for controlling the fuel supply is initiated first in synchronism with the rotation of the engine 20 and calculations required for controlling the ignition is initiated after the preceding calculations.

A diode 5, a capacitor 6 and a constant voltage circuit (CVC) 7 are connected between the key switch 2 and the computer. The cathode and anode of the diode 5 are connected to the IG terminal 2b of the key switch 2 and the grounded negative terminal of the battery 1, respectively. The capacitor 6 is connected in parallel with the diode 6. The constant voltage circuit 7 is connected to be responsive to the voltage across the capacitor 6 and supplies the processing unit 8 and the input/output circuit 9 with a constant voltage $V_{cc}$ [5 volts], thus maintaining the operative condition of the computer.

An initializing pulse generator 15 is connected to be responsive to the voltages at the IG and ST terminals 2b and 2c and produces initializing pulses which are applied to the processing unit 8 and the input/output circuit 9.

The initializing pulse generator 15, shown in FIG. 2 in detail, comprises a battery circuit 15a, a first pulse generator 15b, a second pulse generator 15c and a third pulse generator 15d. The battery circuit 15a includes a diode 151, a capacitor 152, a resistor 153 and a Zener diode 154 and produces a constant voltage (5 volts) regulated by the Zener diode 154. The constant voltage produced by the battery circuit 15a is supplied to the first, second and third pulse generators 15b, 15c and 15d. The first pulse generator 15b is connected to produce a first pulse of a constant time period when the voltage at the IG terminal 2b rises. The second pulse generator 15c connected to produce a second pulse of a constant time period when the voltage at the ST terminal 2c falls. The third pulse generator 15d is connected to produce a third pulse at respective times when the first and second pulses disappear. The pulse generators 15b, 15c and 15d are desirably constituted to include C-MOS one-shot multivibrators such as MC 14528 which is manufactured by MOTOROLA in the United States and low in electric power consumption.

Operation of the embodiment is described next with reference to FIG. 3. It is assumed herein that the key switch 2 is moved from the OFF terminal 2a toward the IG terminal 2b at the time $t_1$, further moved toward the ST terminal 2c at the time $t_3$ and then returned to the IG terminal 2b at the time $t_4$.

When the IG terminal 2b is connected to the battery 1 through the key switch 2 at the time $t_1$ as shown in (a) of FIG. 3, the voltage at the IG terminal 2b or on the power supply bus 2' increases from the grounded voltage toward the battery voltage [12 volts] as shown in (c) of FIG. 3. After a short while from the time $t_1$, the constant voltage circuit 7 and the battery circuit 15a in the initializing pulse generator 15 produce respective constant voltages [5 volts] as shown in (d) of FIG. 3. On the other hand, the first pulse generator 15b starts to produce the first pulse from the time $t_1$ as shown in (e) of FIG. 3. The constant time period ($t_1 \sim t_2$) is determined to be longer than the period in which the voltage at the IG terminal 2b reaches the battery voltage. When the first pulse disappears at the time $t_2$, the third pulse generator 15d starts to produce the third pulse of a constant time period as shown in (g) of FIG. 3. This third pulse is applied to the computer as the initializing pulse to initialize the processing unit 8 and the input/output circuit 9. The computer, having been supplied with the constant voltage by the constant voltage circuit 7 before the time $t_2$ and initialized by the initializing pulse generator 15 after the time $t_2$, is kept under a wait condition for calculating operations.

When the ST terminal 2c is connected to the battery 1 through the key switch 2 at the time $t_3$ as shown in (b) of FIG. 3, the starter motor 4 is engaged with the output shaft of the engine 20 and energized to crank the engine 20. During this cranking condition, the voltage at the IG terminal 2b fluctuates as shown in (c) of FIG. 3, since the IG terminal 2b is electrically connected to the energized starter motor 4 through the key switch 2. The fluctuation of the voltage on the power supply bus 2', however, does not influence the computer, since the voltage supplied to the computer is regulated to the constant voltage by the constant voltage circuit 7. As a result, the computer, initiated by the rotation of the engine 20, performs calculating operations in accordance with the preestablished sequence so that the fuel supply and ignition are controlled suitably.

When the rotational speed of the engine 20 becomes high, the key switch 2 is returned from the ST terminal 2c at the time $t_4$ as shown in (b) of FIG. 3 and the starter motor 4 is disengaged from the engine 20 and deenergized to terminate engine cranking. At this moment, the voltage at the IG terminal 2b or the power supply bus 2' momentarily becomes lower than the grounded voltage due to the negative electric noise signal. This negative voltage [about-100 volts and about 10 milliseconds] is clipped by the diode 5 and the voltage at the cathode of the diode 5 becomes substantially equal to the grounded voltage. The capacitor 6 is thus short-circuited by the diode 5 and the constant voltage circuit 7 produces no output voltage any more. Without the constant voltage $V_{cc}$, the computer is kept inoperative. Even when the voltage on the power supply bus 2' is restored to the battery voltage and the constant voltage $V_{cc}$ is supplied to the computer again after the time $t_4$, the computer still inhibits the calculating operations.

Contrary to the constant voltage circuit 7, the battery circuit 15a in the initializing pulse generator 15 keeps supplying the pulse generators 15b, 15c and 15d with the constant voltage as shown in (d) of FIG. 3, even while the voltage at the IG terminal 2b is lowered below the grounded voltage at the time $t_4$. This is because, in the battery circuit 15a, the diode 151 prevents the electric charge stored on the capacitor 152 before the time $t_4$ from being discharged therethrough and the pulse generators 15b, 15c and 15d are supplied with the electric current from the capacitor 152 through the resistor 153. Thus being kept operative, the second pulse generator 15c produces the second pulse from the time $t_4$ to the time $t_5$ as shown in (f) of FIG. 3. This constant time period ($t_4 \sim t_5$) is determined to be equal to or longer than the period in which the voltage on the power supply bus 2' restores the battery voltage. When the second pulse disappears, the third pulse generator 15d produces the third pulse again at the time $t_5$ as shown in (g) of FIG. 3. This third pulse is applied to the processing unit 8 and the input/output circuit 9 as the initializing pulse to initialize the computer, and the computer is kept under the halt condition for calculating operations again.

Although cranking the engine 20 has been terminated at the time $t_4$ and the computer keeps stopping calculating operations for the fuel supply and ignition thereafter, the engine keeps rotating even at the time when the computer is initialized again. This is because the period in which the computer stops calculating operations is short enough in comparison with the period in which the engine 20 attains one rotation. Therefore, the computer, initiated by the rotation of the engine 20, starts to perform calculating operations in accordance with the preestablished operating sequence immediately after the initialization. The engine 20, the fuel supply and ignition thereof being calculated by the computer and controlled by the controllers 13 and 14, keeps rotating unitl the key switch 2 is disconnected from the IG terminal 2b to the OFF terminal 2a.

It should be noted in the foregoing description that the computer may be programmed to control other devices mounted on the vehicle, and that any kinds of computers such as microcomputers known as TLCS-12A manufactured by TOKYO SHIBAURA ELECTRIC in Japan and M6800 manufactured by MOTOROLA in the United States may be utilized. The signal level of the initializing pulses can be modified with ease by a person skilled in this art in dependence on computers utilized.

The present invention is not limited to the embodiment described hereinabove, because many modifications may be attained without departing from the spirit of the invention.

What is claimed is:

1. In a vehicle control system having an engine, a battery, a starter motor adapted to crank said engine with the electric power supplied thereto, a digital computer programmed to be initialized and perform calculations required for vehicle controls according to a preestablished operating sequence with the electric power supplied thereto, and a key switch connected to said battery and movable to a first terminal for supplying said digital computer with the electric power and to a second terminal for supplying said digital computer and said starter motor with the electric power, an initializing apparatus comprising:

first pulse generator means responsive to the voltage change developed on said first terminal when said key switch is moved thereto and effective to generate a first pulse having a first constant time period;

second pulse generator means responsive to the voltage change developed on said second terminal when said key switch is moved therefrom and effective to generate a second pulse having a second constant time period;

third pulse generator means responsive to said first and second pulses and effective to generate a third pulse in synchronism with each disappearance of said first and second pulses, said third pulse being applied to said digital computer to initialize the same; and a battery circuit means including a diode and a capacitor which are connected such that said capacitor is charged by said battery through said diode with said key switch being moved to said first and second terminals and supplies said three pulse generator means with the electric power therefrom.

2. An initializing apparatus according to claim 1, wherein said battery circuit means further includes a resistor and a Zener diode connected in series across said capacitor such that said Zener diode regulates the electric power supplied to said three pulse generator means to a constant voltage.

3. An initializing apparatus according to claim 1, wherein said first constant time period of said first pulse is determined to be longer than a time period in which the voltage appearing at said first terminal changes from zero to the voltage across said battery, and wherein said second constant time period of said second pulse is determined to be longer than a time period in which the voltage appearing at said first terminal is restored to the voltage across said battery after the movement of said key switch from said second terminal to said first terminal.

4. In a vehicle control system having an engine, a battery, a starter motor adapted to crank the engine with the electric power supplied thereto, a digital computer programmed to be initialized and perform calculations required for vehicle controls according to a preestablished operating sequence with the electric power supplied thereto, and a key switch connected to the battery and movable to a first terminal for supplying the digital computer with the electric power and to a second terminal for supplying the digital computer and the starter motor with the electric power, an initializing method comprising the steps of:

automatically generating a first pulse having a first constant time period responsive to the voltage change developed on the first terminal when the key switch is moved thereto;

automatically generating a second pulse having a second constant time period responsive to the voltage change developed on the second terminal when the key switch is moved therefrom;

automatically generating a third pulse responsive to the first and second pulses and in synchronism with each disappearance of the first and second pulses, the third pulse being applied to the digital computer to initialize the same.

* * * * *